US008478448B2

(12) United States Patent
Krueger

(10) Patent No.: US 8,478,448 B2
(45) Date of Patent: Jul. 2, 2013

(54) CONTROL DEVICE FOR WIND POWER SYSTEMS HAVING POWER FAILURE DETECTION

(75) Inventor: Thomas Krueger, Westerroenfeld (DE)

(73) Assignee: REpower Systems SE, Hamburg (DE)

( * ) Notice: Subject to any disclaimer, the term of this patent is extended or adjusted under 35 U.S.C. 154(b) by 469 days.

(21) Appl. No.: 12/808,091

(22) PCT Filed: Dec. 4, 2008

(86) PCT No.: PCT/EP2008/010312
§ 371 (c)(1),
(2), (4) Date: Jun. 14, 2010

(87) PCT Pub. No.: WO2009/077089
PCT Pub. Date: Jun. 25, 2009

(65) Prior Publication Data
US 2010/0283247 A1  Nov. 11, 2010

(30) Foreign Application Priority Data

Dec. 14, 2007  (DE) .......................... 10 2007 060 958

(51) Int. Cl.
*G06F 19/00*  (2011.01)
(52) U.S. Cl.
USPC .............................. 700/286; 700/287; 290/44
(58) Field of Classification Search
USPC .............................. 290/44; 700/287, 292, 286
See application file for complete search history.

(56) References Cited

U.S. PATENT DOCUMENTS

| 5,652,485 | A | * | 7/1997 | Spiegel et al. ................. 318/147 |
| 5,798,632 | A | | 8/1998 | Muljadi |
| 6,137,187 | A | | 10/2000 | Mikhail et al. |
| 7,038,330 | B2 | * | 5/2006 | Rosebrock et al. ............. 290/44 |
| 7,355,294 | B2 | * | 4/2008 | Teichmann ...................... 290/44 |
| 7,586,205 | B2 | | 9/2009 | Krueger |
| 7,740,448 | B2 | * | 6/2010 | Meyer et al. ....................... 416/1 |
| 7,948,102 | B2 | * | 5/2011 | Schubert et al. ................. 290/44 |
| 8,116,914 | B2 | * | 2/2012 | Oohara et al. ................ 700/287 |
| 8,123,477 | B2 | * | 2/2012 | Risager et al. .................... 416/1 |
| 8,242,617 | B2 | * | 8/2012 | Bjerge et al. .................... 290/44 |

(Continued)

FOREIGN PATENT DOCUMENTS

DE  10 2005 029 000  12/2006

OTHER PUBLICATIONS

Muljadi, E., & Butterfield, C. P. (2001). Pitch-controlled variable-speed wind turbine generation. Industry Applications, IEEE Transactions on, 37(1), 240-246.*

(Continued)

*Primary Examiner* — Michael D Masinick
(74) *Attorney, Agent, or Firm* — Morrison & Foerster LLP

(57) ABSTRACT

A wind energy installation control device includes a wind rotor, a generator driven by the wind rotor, a torque control unit configured to control a torque of the generator, and a control system. The control system includes a detector configured to identify a grid dip and an end of the grid dip, a residual torque transmitter configured to provide a set point for a torque of the generator after identification of the grid dip, and an initializer configured to initialize a component of the torque control unit at the set point. Accordingly, upon return of grid power after a grid dip, the vibration behavior of a wind power system can be significantly improved. Overload of a drive train upon return of grid voltage can thus be reduced.

19 Claims, 6 Drawing Sheets

U.S. PATENT DOCUMENTS

| | | | |
|---|---|---|---|
| 8,326,577 B2* | 12/2012 | Graham et al. | 702/181 |
| 2003/0151259 A1 | 8/2003 | Feddersen et al. | |
| 2006/0163881 A1* | 7/2006 | Bucker et al. | 290/44 |
| 2007/0267873 A1* | 11/2007 | Teichmann | 290/44 |
| 2007/0273155 A1* | 11/2007 | Barton et al. | 290/44 |
| 2008/0069692 A1* | 3/2008 | Oohara et al. | 416/31 |
| 2009/0250931 A1* | 10/2009 | Schubert et al. | 290/44 |
| 2010/0013235 A1* | 1/2010 | Bjerge et al. | 290/55 |
| 2011/0095532 A1* | 4/2011 | Schubert et al. | 290/44 |

OTHER PUBLICATIONS

Sun, T., Chen, Z., & Blaabjerg, F. (Nov. 2003). Voltage recovery of grid-connected wind turbines after a short-circuit fault. In Industrial Electronics Society, 2003. IECON'03. The 29th Annual Conference of the IEEE (vol. 3, pp. 2723-2728). IEEE.*

"Improved Vector Control of DFIG Based Wind Turbine during Grid Dips and Swells", Hailiang Xu et al, Zhejiang University, China, Electrical Machines and Systems, 2010 International Conference.*

"A Novel Robust Low Voltage and Fault Ride Through for Wind Turbine Application Operating in Weak Grids", Rathi et al, IEEE 2005.*

"Comparison of Fault Ride-Through Strategies for Wind Turbines with DFIM Generators", Dittrich et al, Integral Drive Systems, EPE 2005.*

International Search Report mailed Dec. 11, 2009, directed to International Patent Application No. PCT/EP2008/010312; 5 pages.

* cited by examiner

CONTROL DEVICE FOR WIND POWER SYSTEMS HAVING POWER FAILURE DETECTION

REFERENCE TO RELATED APPLICATIONS

This application is a national stage application under 35 USC 371 of International Application No. PCT/EP2008/010312, filed Dec. 4, 2008, which claims the priority of German Patent Application No. 10 2007 060 958.4, filed Dec. 14, 2007, the contents of which prior applications are incorporated herein by reference.

FIELD OF THE INVENTION

The invention relates to a control device for wind energy installations having a wind rotor, a generator driven by the wind rotor, and a torque control unit for controlling the torque of the generator.

BACKGROUND OF THE INVENTION

Virtually all modern wind energy installations are de-signed for a variable rotation speed. This means that the wind rotor, which generally drives the generator via a transmission, can be operated at a different speed, depending on the wind conditions. To this end, a capability is provided to vary the pitch angles of the rotor blades of the wind rotor. Varying the pitch angle varies the wind power that the wind rotor extracts from the wind. The torque control unit correspondingly varies the torque of the generator, and therefore the emitted electrical power. A conventional closed-loop control system generally provides for the pitch control unit and the torque control unit to be connected to a superordinate operating point module, which determines nominal value presets for the pitch and torque control units, and applies them thereto.

The control device can be designed such that the pitch control unit and the torque control unit are independent of one another (U.S. Pat. No. 6,137,187). However, it is also possible for the two control units to be linked to one another (DE 10 2005 029 000), in such a way that the linking makes it possible to achieve a significant improvement in transitional behavior between partial-load operation and full-load operation of the wind energy installation.

When grid disturbances occur during operation, in particular brief voltage dips as a result of a short, then variable rotation-speed wind installations can also be affected by them. Conventionally, the wind energy installation is disconnected from the grid, as a result of which less power is available in the grid. This is counterproductive in the event of a short. It is therefore desirable to keep the wind energy installation connected to the grid, at least during short voltage dips, thus allowing power to be fed into the grid again from the wind energy installation as quickly as possible at the end of the voltage dip. This aspect of the wind energy installation still being connected to the grid throughout the duration of the voltage dip is referred to as "low voltage ride through".

Because of the rapid changes which occur in the electrical grid parameter when the grid collapses, corresponding, highly dynamic effects occur on the wind energy installations and their drive train, resulting in oscillations. These oscillations, which occur at the start of the grid dip, are in practice excited again at the end of the grid dip, that is to say when the voltage returns. Torque peaks can occur in this case, which are more than twice the rated torque. There is therefore a risk of the drive train of the wind energy installation fracturing, and a risk of damage to the surrounding area. One known remedy is to appropriately derate the mechanical drive train. However, this has the disadvantage that the wind energy installation production costs are considerably increased.

SUMMARY OF THE INVENTION

Against the background of the last mentioned prior art, the invention is based on the object of improving the behavior of the wind energy installation when temporary voltage dips occur in the grid (low voltage ride through").

The solution according to the invention resides in the features broadly disclosed herein. Advantageous developments are described in the disclosure below.

In the case of a control device for wind energy installations having a wind rotor and a generator which is driven at a variable rotation speed by the wind rotor, which control device has a pitch control unit for the rotation speed of the wind rotor and a torque control unit for the torque of the generator, the invention provides a detector for identification of a grid dip and of its end, a torque transmitter, which provides a set point for a torque of the generator after identification of the grid dip, and an initializer, which initializes a component of the torque control unit at the set point, after identification of the grid dip.

The essence of the invention is the concept of forcing the torque control unit to be set to a specific value for the end of the voltage dip. This can be done by setting the integrator state to a value identical to zero. This means that, as a result of the initialization, the torque control unit is set a value which is well away from possible saturation limits of the control unit, in particular of regulators which are implemented in it. The invention has identified that, in the case of closed-loop control devices that are used in the conventional manner there is a risk of these devices becoming saturated at the end of the grid dip, because the actual torque which in fact occurs throughout the duration of the grid dip differs to a major extent from the originally intended nominal values. The regulators would then no longer be able to react sufficiently sensitively to the end of the grid dip. The invention has identified that these negative consequences can be avoided by deleting the "memory" of the control device. This is achieved by the initialization. This ensures that saturation at the end of the grid dip is prevented, and that the control device therefore has an adequate control margin. With the initialization, it can be set to a start value which optimally damps the drive train oscillations. The invention achieves an amazingly good result, in comparison to oscillation damping, with little complexity.

A number of the terms used will first of all be explained in the following text:

Initialization means setting the nominal value of a control unit to a specific value. Previous discrepancies become ineffective. The history of the control device is therefore, so to speak, deleted.

A control unit means a device which provides open-loop or closed-loop control for a control variable as a function of at least one input parameter. It is therefore based on a wider understanding of the term, which also includes a closed-loop control device.

An I-element of the control unit means a component which ensures steady-state accuracy. One example of this is a conventional PI or PID regulator with its I-element. The term "I-element" is, however, not restricted to this but also covers components which ensure steady-state accuracy with other control concepts, such as state regulators or fuzzy control systems. For the purposes of the invention, the return of the grid voltage means that the grid voltage has risen to an adjustable threshold voltage which is permissible during steady-state operation (generally about 90% of the rated voltage).

It is particularly preferable for this to be an I-element which is initialized. The I-element is that component of the control unit which ensures steady-state accuracy. However, this is not entirely the case in the context of the invention but, on the contrary, the action on the I-element is used to improve the regulator dynamics. Surprisingly, by deliberately influencing the component for steady-state accuracy, specifically the I-element, the invention improves the dynamics, to be precise by greatly reducing the load on the drive train when the grid returns. Paradoxically, it is actually action on the I-element which ensures an improvement in the dynamic response.

This positive influence of the action on the I-element can be enhanced by the initializer furthermore varying a weighting factor of the component in the torque control unit. The initializer therefore does not just act on the component but also increases its weighting within the torque control unit. If the component is the I-element, this means that its weighting factor is varied, preferably increased. In one development, the initializer can vary at least one further weighting factor of another component. By way of example, this may be a P-element of a PI-regulator or an equivalent functional unit in some other control concept. This weighting factor is preferably varied in the opposite sense to the variation of the weighting factor in the I-element. The weighting factors are expediently not varied in the long term, but temporarily over an adjustable time period. This allows the variation of the weighting factors to be limited to the time period which is required for the oscillations in the drive train to decay.

Furthermore, the initializer is preferably designed to output an amended setting point for a rotation speed to the pitch control unit and/or torque control unit. This makes it possible to vary the rotation speed set point, in particular to increase it, for the end of the voltage dip. It has been found that a variation, in particular an increase, in the rotation speed setting point makes it possible to protect the control units for the torque and the pitch even better against saturation. In contrast, with conventional regulator concepts, the respective regulators frequently become saturated when the rotation speed set point is not varied, that is to say they reach their regulator limits, as a result of which the control dynamics are then at least temporarily lost. It has been found to be particularly advantageous to set the rotation speed value higher than the value which would correspond to the respective operation situation, for example by 5% or—when on partial load—to the rated rotation speed. In this case, it is also possible to choose the setting points for the pitch control unit and for the torque control unit to be different. For the purposes of the invention, it is particularly advantageous to vary only the setting point for the torque control unit.

According to a further advantageous embodiment, an input filter is provided for a nominal value input of the torque control unit, to which input filter a setting point of the rotation speed is applied as an input. This results in the capability of applying this amended value as an input signal to the input filter when the rotation speed setting point is varied. By comparison of the setting value with the actual rotation speed, the input filter determines a value for a reference variable which is applied to the torque control unit. An input filter such as this allows the rotation speed setting point for the torque control unit to be varied as desired in a particularly simple and expedient manner.

According to one particularly advantageous development, a determination module is provided for the set point, and is designed to determine a safe torque as a function of the severity of the grid dip. A safe torque means a torque which corresponds to the residual torque which is still available when the grid is in the respective state. The determination module expediently has a characteristic element which preferably corresponds on the basis of a relationship $[M_S = M_N \cdot U_I / U_N]$. In this case, $M_N$ is the rated torque, $U_N$ is the rated voltage and $U_I$ is the residual voltage which is actually still present. The determination module advantageously has a minimum memory, which stores the safe torque associated with the respective lowest measured voltage, and produces this as an output value of the determination module.

Furthermore, a pilot control module is expediently provided which is designed to identify the occurrence of an excessive torque above the safe torque during the grid dip. The pilot control module has a detector for identification of the grid dip, and a comparator. When the detector identifies the occurrence of the grid dip, then the comparator compares the torque of the generator with the safe torque, and outputs a signal if it is exceeded. The pilot control module preferably interacts with the torque control unit such that it applies a residual torque set point to the generator, bypassing the torque control unit, during the grid dip. This residual torque set point is expediently calculated from the safe torque. The definition of the torque avoids the generator, and the converter which interacts with it, from being overloaded. The actual torque control unit now has no effect and can be initialized by the initializer. This creates the preconditions for the torque control unit starting to act smoothly at the end of the voltage dip. A quick-acting pitch adjustment module is preferably also provided, and interacts with the pitch control unit. This is controlled by the pilot control module such that the pitch angle of the rotor blades is varied through a specific angle $\Delta v$ at the maximum possible adjustment rate. This adjustment angle is calculated as a function of the start angle of the rotor blades and the magnitude of the sudden torque change which results from the difference between the previously existing torque and the residual torque which is now applied. It is particularly preferable for the adjustment angle $\Delta v$ to be calculated using the relationship $\Delta v = f(v_0) \times v_A \times (M_0 - M_R)$, where $v_0$ is the start angle $v_A$ is the generalized blade adjustment amplitude, $M_0$ is the torque before the grid dip, and $M_R$ is the residual torque. The blade pitch amplitude is preferably adjusted in the range between 5-10°. The function F is a function which takes account of the non-linear characteristics of the aerodynamics of the rotor blade.

The invention also relates to a wind energy installation having a tower, a pod which is arranged thereon and has a wind rotor on one end face which drives a generator via a rotor shaft, which generator uses a converter to output electricity to an electrical grid, and an operating control system, with a control device as described above also being provided.

The invention also relates to a corresponding method for operation of a wind energy installation.

BRIEF DESCRIPTION OF THE DRAWINGS

The invention will be explained in the following text with reference to the attached drawings, in which one advantageous exemplary embodiment is illustrated, and in which.

DETAILED DESCRIPTION OF THE INVENTION

Figure 1:
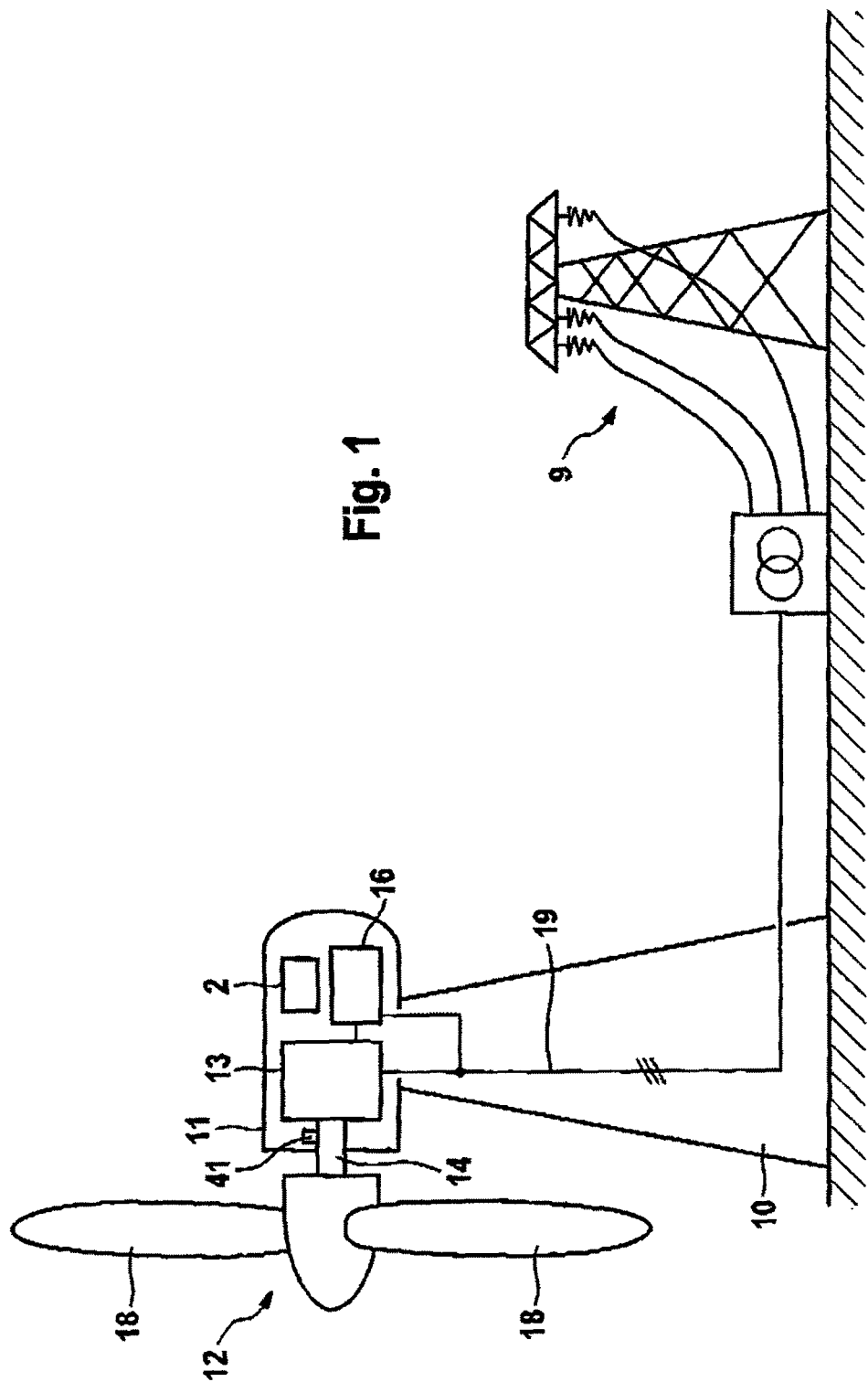
FIG. 1: shows a schematic overview illustration of one exemplary embodiment according to the invention of a wind energy installation which is connected to an electrical supply grid.

FIG. 1 illustrates a wind energy installation which is designed to implement the invention and is annotated in its totality with the reference number 1. In a manner known per se, this wind energy installation has a pod 11 which is arranged on a tower 10 such that it can swivel in the azimuth direction. A wind rotor 12 is arranged such that it can rotate on the end face of the pod 11 and, via a rotor shaft 14, drives a generator 13 which is preferably in the form of a double-fed asynchronous machine with rotor and stator winding having a number of winding sections. The stator winding of the generator 13 is connected directly to a connecting line 19 of the wind energy installation 1. The rotor winding (not illustrated) is likewise connected via a converter 16, to the connecting line 19. Furthermore, an operating control system 2 is provided, and is preferably arranged in the pod 11.

Figure 2:
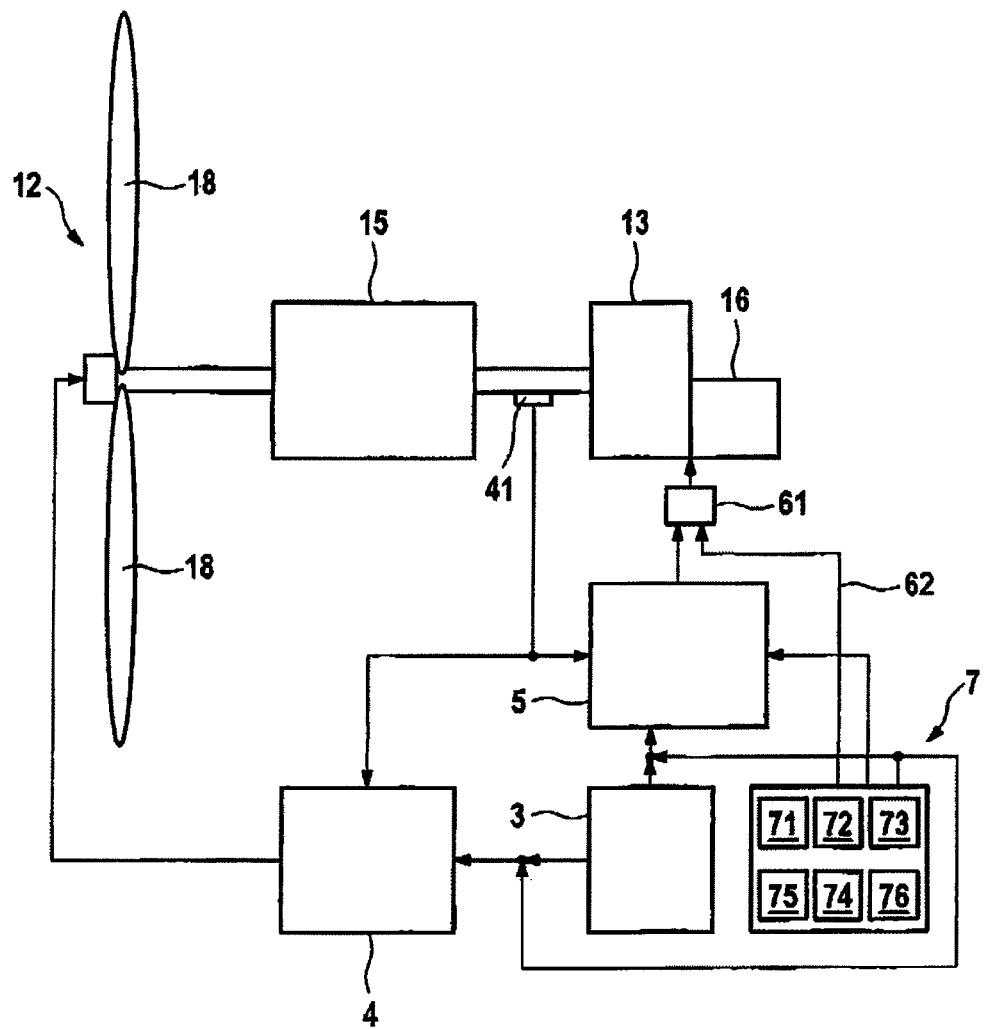
FIG. 2: shows a block diagram of the wind energy installation shown in FIG. 1.

During normal operation, the mechanical power (wind power) extracted from the wind by the wind rotor 12 is transmitted via the rotor shaft 14 and an optional transmission 15 (see FIG. 2) to the generator 13 which produces electrical power, which is fed into the grid 9 via the connecting line 19. The wind energy installation 1 therefore has two main systems, on the one hand the mechanical system with the wind rotor 12, and on the other hand the electrical system with the generator 13, as central components. The two main systems are provided with their own control unit subordinate to the operating control system 2. They are controlled by the operating control system by means of a dedicated module, specifically a working point generator 3.

A pitch control unit 4 is provided in order to control the mechanical system with the wind rotor 12 and comprises a rotation speed sensor 41, which is arranged on the rotor shaft 14 and detects its speed of revolution. When a transmission 15 is used, the rotation speed sensor is preferably arranged on the "high-speed shaft", that is to say on the generator side of the transmission 15. This is connected as an input signal to the pitch control unit 4. A nominal value for the rotation speed is applied by the working-point generator 3 to a further input of the pitch control unit 4. The pitch control unit 4 uses a comparator to calculate a difference between the applied nominal rotation speed and the actual rotation speed determined by the rotation speed sensor 41, and from this determines a value for a pitch angle of the blades 18 of the rotor. The blades 18 are then rotated via a pitch drive (not illustrated) which is arranged o the rotor, to be more precise in the rotor hub, such that the desired pitch angle is reached. The wind power extracted from the wind is therefore varied, and therefore also the rotation speed of the rotor 12. The pitch control unit 4 therefore provides closed-loop control of the rotation speed.

A torque control unit 5 is provided for the electrical system and likewise receives, as an input value, the actual rotation speed measured by the rotation speed sensor 41 as well as a nominal rotation speed value determined by the working-point generator 3. Both signals are applied to inputs and a difference is formed between them. The torque control unit 5 determines from this a required value for an electrical torque (nominal torque), which is applied to the generator 13 and to its converter 16. The converter 16 operates the generator 13 with electrical parameters such that an appropriate electrical torque is set, in accordance with the nominal torque set point.

Figure 3:
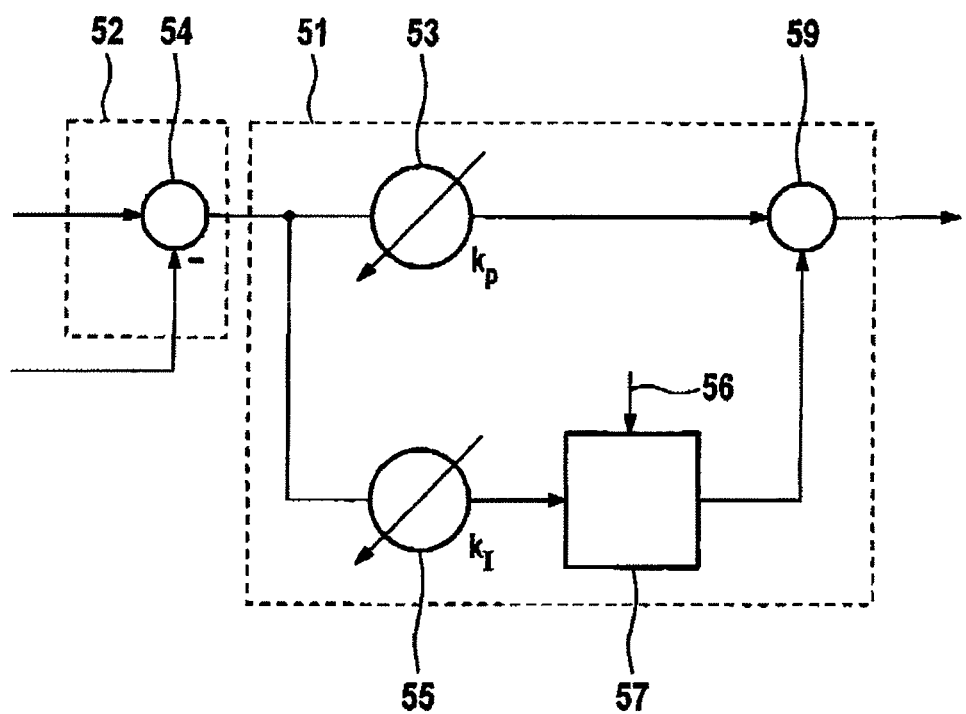
FIG. 3: shows a schematic view of a torque control unit in the wind energy installation.

The method of operation of the torque control unit 5 will be explained in the following text with reference to FIG. 3. The wind energy control unit 5 comprises a regulator core 51 and an input filter 52. The two inputs for the actual rotation speed and the nominal value provided by the working-point generator 3 are applied to the input filter 52 which has a subtraction element 54 and produces the difference between the two rotation speed signals at its output. This output signal from the input filter 52 is applied to one input of the regulated core 51. In the illustrated exemplary embodiment, the regulated core 51 is in the form of a PI regulator and has a P-component and an I-component. The P-component 53 comprises a proportional element 53 which multiplies the applied input signal by an adjustable factor $k_P$, and applies this to an input of an adder 59. The I-element comprises a second proportional element 55, which carries out a multiplication by a coefficient $k_I$. It also has an integrator 57, to whose input the output of the proportional element 55 is applied. One output signal of the integrator 57 is applied to another input of the adder 59. The integrator furthermore has a reset input 56. When a signal is applied to this reset input 56, then the integrator is initialized at this value. The regulated response of the PI regulator can be adjusted by means of the two coefficients $k_P$ and $k_I$. The adding element 59 forms an output signal which is applied to one input of a switching unit 61 (see FIG. 2). A signal line 62 for a fixed torque is connected to another input of the switching unit 61. The output of the switch 61 forms the output of the torque control unit 5, and is applied to the generator/converter 13.

Furthermore, the wind energy installation has an additional module 7 which interacts with the control unit 2. The additional module 7 has a detector 71 for identification of grid dip, a torque transmitter 72 which determines a set point for a torque to be set by the torque control device 5, and an initializer 73 which acts on the integrator 57 in the regulator core 51. The invention operates as follows: the detector 71 determines whether a grid dip has occurred, and detects when it ends again. The torque transmitter 72 produces a set point for the torque, which is applied to the generator 13 for the end of the grid dip via the signal line 62. Furthermore, the detector 71 triggers the initializer 73 such that it initializes the integrator 57 at the end of the grid dip, to be precise at the torque provided by the torque transmitter 72. Furthermore, the initializer 73 acts on the proportional elements 53, 55, to be precise such that, when the grid voltage returns, the coefficients $k_P$ and $k_I$ are set to predetermined different values. These values are maintained for an adjustable time of, for example, 10 seconds. This time period is considerably longer than the time period of about one second during which the integrator 57 is initialized by applying the set point for the torque at the initialization input 56.

Figure 4:
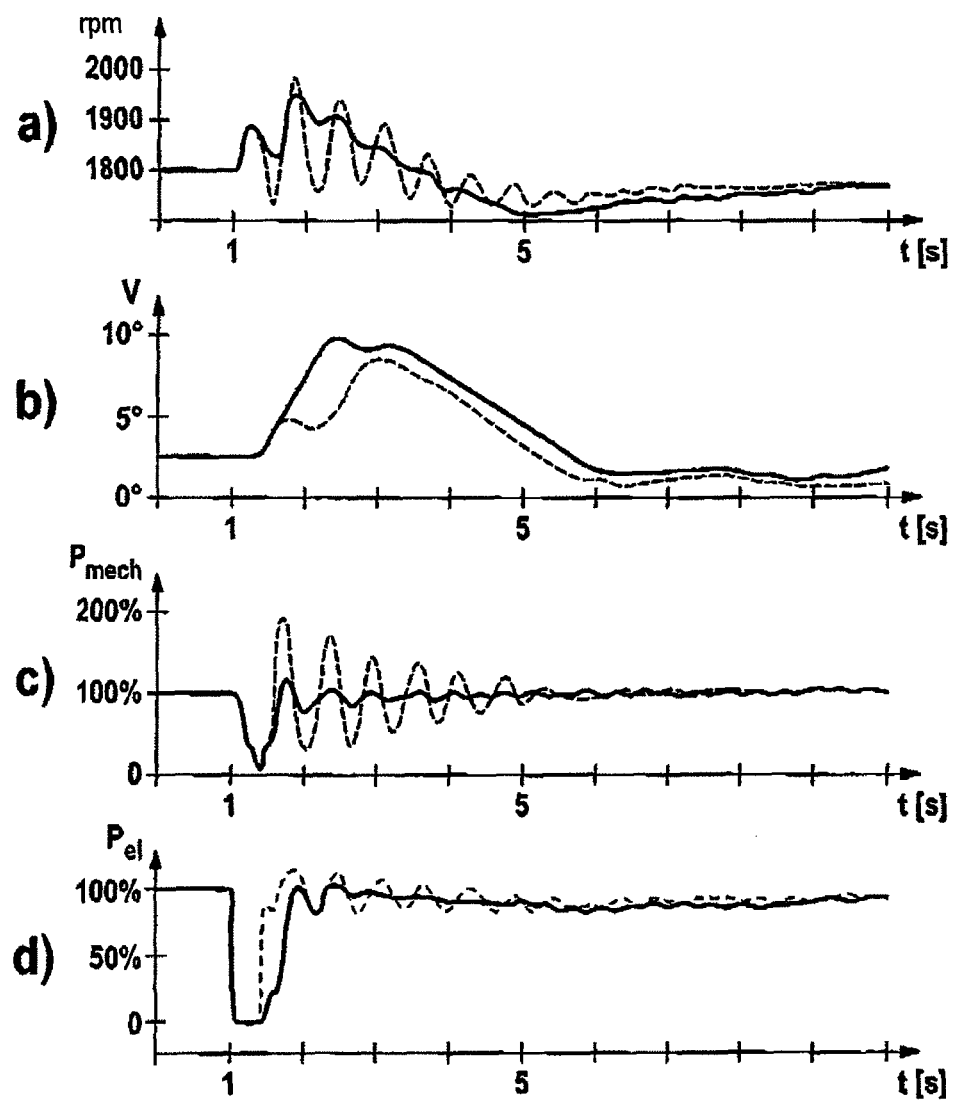
FIG. 4: shows graphs with time profiles of a number of parameters during a voltage dip.
Figure 5:
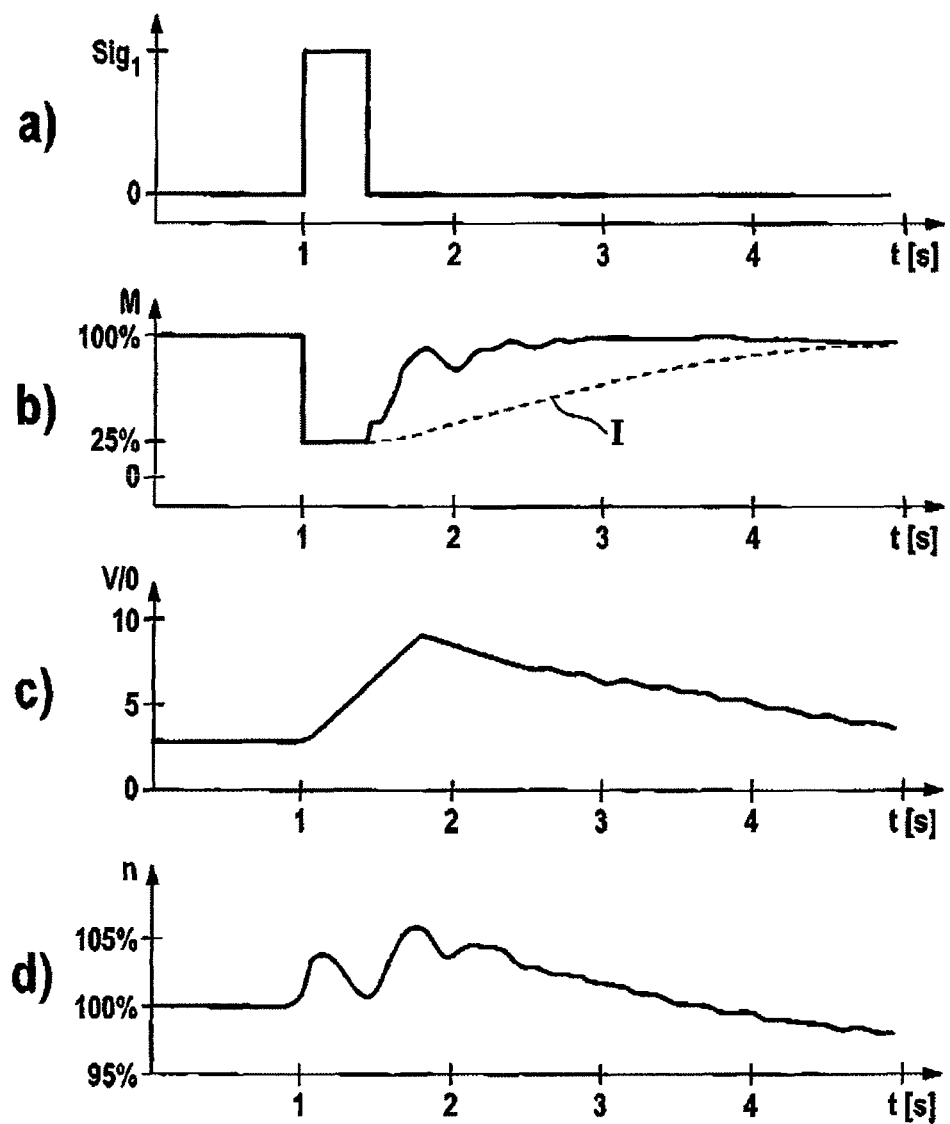
FIG. 5: shows a further graph with time profiles on an enlarged time scale.
Figure 6:
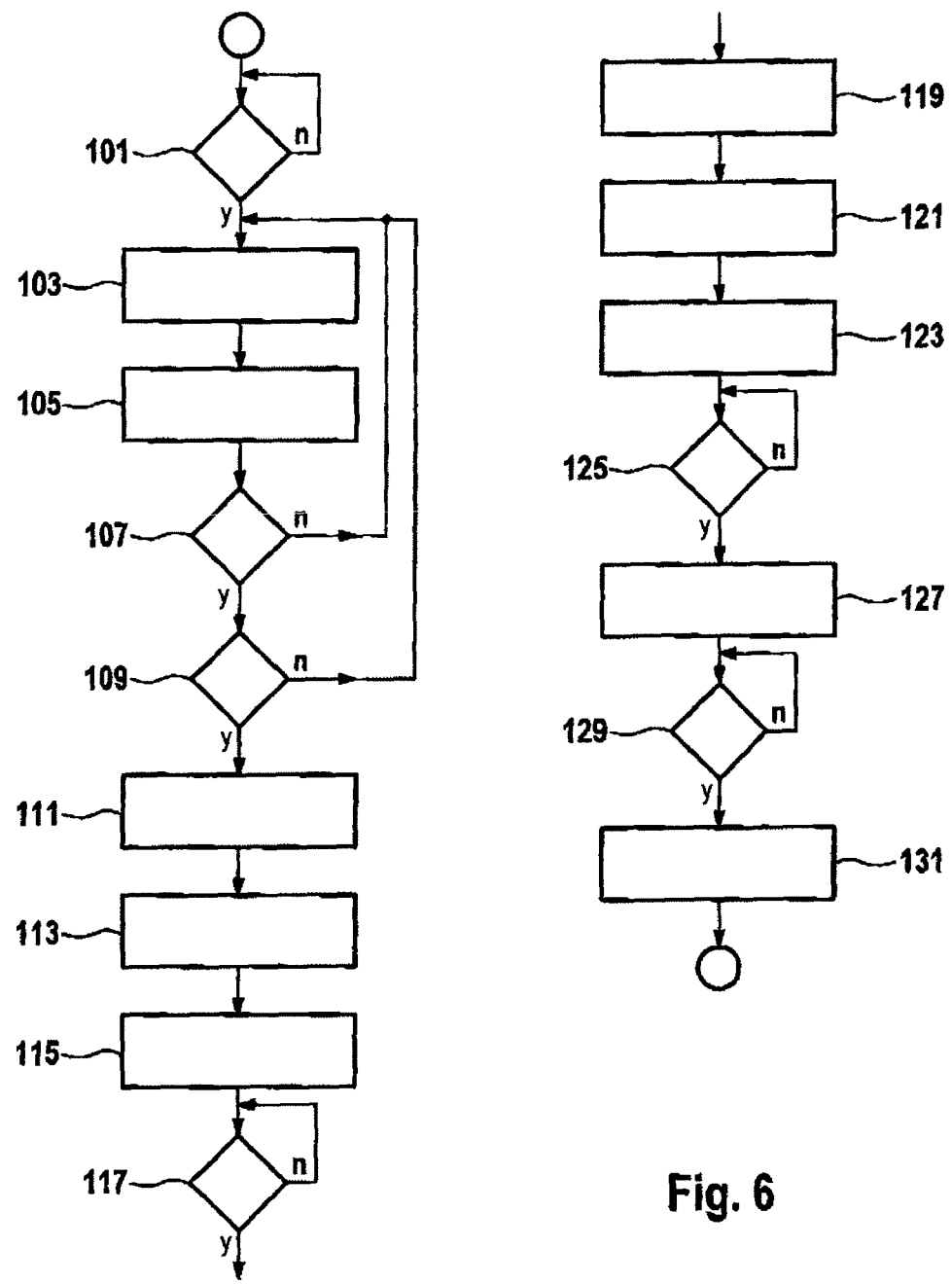
FIG. 6: shows a flowchart for the method according to the exemplary embodiment.

Reference will now be made to FIGS. 4 to 6 in order to explain how a conventional control device [cuts off] the wind energy installation responds to a grid dip when the detector 71 determines the presence of a grid dip (step 101). For this purpose, in the illustrated embodiment, the detector 71 is in the form of a threshold-value switch which emits a signal when the value of the grid voltage falls below an adjustable threshold. The grid dip, which is assumed to start the time t=1 second, and the output signal which results from this from the detector 71, are illustrated in FIG. 5a. When a grid dip is identified, a determination module 74 uses the relationship $M_R = M_N \times U/UN$ (step 105) to determine a residual torque as a function of the grid voltage measured during the grid dip (step 103). The determination module 74 has a minimum detector, which stores the minimum value of the residual torque determined during the course of the grid dip, and produces this as an output signal (step 107). The torque transmitter 72 uses a comparator 75 to check whether a nominal torque demanded by the torque control unit 5 is greater than the determined residual torque (step 109). If this is the case, the nominal torque is limited to the residual torque, and the initializer 73 is activated (steps 111, 113). This is designed to operate the switching unit 61 such that the residual torque, which is considered to be safe, is applied as the nominal torque to the generator/converter 13, 16. This prevents both the generator 13 and the converter 16 from being overloaded during the grid dip. The initializer 73 also causes the integrator 57 in the regulator core 51 to be initialized, to be precise likewise to the value of the residual torque. This results in the PI regulator core 51 being started smoothly when the voltage returns. Finally, the initializer 73 acts on the pitch adjustment unit 4, to be precise such that the rotor blades 18 are adjusted through an angle Δv at the maximum possible adjustment rate (step 115). This adjustment angle Δv is calculated as a function of the start angle $v_0$ and the torque difference between the torque $M_0$ applied when the grid dip occurred, and the calculated residual torque using the following relationship: $\Delta v = f(v_0) \times v_A \times (M_0 - M_R)$, where $v_A$ is the generalized blade pitch amplitude and is preferably in the range between 5 and 10°, and the function $f(v_0)$ is a non-linear function, which takes account of the aerodynamics of the rotor blade 18 and can be determined empirically for each rotor blade 18.

When the grid voltage returns at the end of the grid dip at t=1.5 s (step 117), then the output signal from the detector 71 is reset before the threshold voltage is exceeded. In this case, the initializer 73 is activated again, and determines an amended setting point for the rotation speed (step 119). This can be done by a calculation itself or by accepting a signal from the superordinate control system 2. The setting value is expediently chosen such that a higher rotation speed is defined than that which corresponds to the operating state before the grid dip; alternatively, the rated rotation speed can also be provided as the setting value. This setting value is applied by an override module 76 to the input for the setting value of the input filter 52. This prevents the torque control unit 5, to be precise in particular its regulated core 51, from immediately becoming saturated when the voltage returns. This variation of the setting value for the rotation speed is expediently maintained for a presettable time of, of example, one second. Furthermore, at the end of the grid dip, the initializer 73 varies the gain factors $k_P$ and $k_I$ of the proportional elements 53, 55 in the regulator core 51 (step 121). Its values are varied such that the value $k_I$ is increased and the value $k_P$ is reduced proportionally. This increases the weighting of the I-element in the regulator core 51, as a result of which—as the invention has identified—it is possible to achieve a better regulator transient response. The torque defined by the torque control unit 5 is illustrated in FIG. 5b, with the dashed line indicating the output value from the I-element. This shows the torque rising again harmonically and virtually without any overshoots, without exceeding the output value. The variation of the gain factors $k_P$ and $k_I$ is also only temporary, for example for a time period of 10 seconds. Furthermore, when the grid voltage returns, the integrator 53 is initialized again, to be precise at the value of the residual torque. Once a predetermined first time period has elapsed (step 125), for example one second, the initializer is enabled again (step 127). The coefficients and the nominal rotation speed value are correspondingly reset to the initial value (step 131) after a second time period has elapsed (step 129), for example 10 seconds. Normal operation is therefore resumed.

The combination of these measures prevents the torque and pitch control units 4, 5 from becoming saturated when the grid voltage returns. The closed-loop control system can therefore develop its full effect, thus resulting in the power rising more smoothly, in a better-controlled manner, at the end of the grid dip, thus avoiding damaging oscillations in the drive train. This is illustrated in FIG. 4. FIG. 4a shows the generator rotation speed, FIG. 4b shows the blade angle, FIG. 4c shows the drive train loads, and FIG. 4d shows the electrical power. For comparison, a dashed line shows the respective profile without the present invention. This clearly shows that the considerable drive train loads (FIG. 4c) which may result in values of up to 230% of the rated torque without the invention, are greatly damped, and only overshoots of about 30% now occur. These can be coped with out any problems. The rotation speed oscillations which occur in this case are minimal. FIG. 4a clearly shows the way in which the invention smoothes the generator rotation speed. Its oscillations are greatly reduced, and have an amplitude which now corresponds only to about ¼ of that which occurs without the invention. The electrical power (FIG. 4d) rises correspondingly more slowly, but reaches the initial value again about 0.5 seconds after the grid voltage returns.

The invention claimed is:

1. A wind energy installation control device, comprising:
a wind rotor;
a generator driven by the wind rotor;
a torque control unit configured to control a torque of the generator; and
a control system comprising a detector configured to identify a grid dip and an end of the grid dip, a residual torque transmitter configured to provide a set point value for a torque of the generator after identification of the grid dip, wherein the set point value is closer to the saturation limit of the torque control unit than the set point value being used before the grid dip, and an initializer configured to initialize a component of the torque control unit at the set point value.

2. The wind energy installation control device of claim 1, wherein the component of the torque control unit is an steady-state accuracy component.

3. The wind energy installation control device of claim 1, wherein the initializer is configured to vary a weighting factor of the component in the torque control unit.

4. The wind energy installation control device of claim 3, wherein the initializer is configured to vary at least one additional weighting factor of another component in a sense opposite to the variation of the weighting factor of the component.

5. The wind energy installation control device of claim 3, wherein the initializer is configured to vary at least one additional weighting factor of another component.

6. The wind energy installation control device of claim 5, wherein the initializer is configured to vary the weighting factors temporarily over an adjustable time period.

7. The wind energy installation control device of claim 1, further comprising a determination module for a set point value configured to determine a safe torque as a function of the severity of the grid dip.

8. The wind energy installation control device of claim 7, wherein the determination module has a characteristic element.

9. The wind energy installation control device of claim 1, wherein the control system further comprises an override module configured to apply an amended setting point for a rotation speed to at least one of a pitch control unit and the torque control unit.

10. The wind energy installation control device of claim 9, wherein setting points for the pitch control unit and for the torque control unit are different.

11. The wind energy installation control device of claim 9, wherein an amended rotation-speed setting point is applied to an input filter for a regulated core of the torque control unit.

12. The wind energy installation control device of claim 1, wherein the control system further comprises a pilot control module configured to identify the grid dip and an occurrence of an excessive torque.

13. The wind energy installation control device of claim 12, wherein the pilot control module is configured to act on a switching device to apply a nominal torque to the generator during the grid dip.

14. The wind energy installation control device of claim 12, wherein the pilot control module is configured to interact with the initializer to initialize the component of the torque control unit.

15. The wind energy installation control device of claim 14, wherein the component of the torque control unit is a steady-state accuracy component.

16. The wind energy installation control device of claim 12, wherein the control system further comprises a quick-acting pitch adjustment module configured to be controlled by the pilot control module.

17. A wind energy installation comprising the wind energy installation control device of claim 1.

18. A method of operating a wind energy installation having a generator driven by a wind rotor for producing and feeding electrical energy into a grid and a control device with a torque control unit, comprising:
   identifying a grid dip and a return of grid voltage;
   determining a set point value for a torque of the generator after identification of the grid dip, wherein the set point value is closer to the saturation limit of the torque control unit than the set point value being used before the grid dip; and
   initializing a component in the torque control unit at the set point value.

19. A method of operating a wind energy installation having a generator driven by a wind rotor for producing and feeding electrical energy into a grid and a control device with a torque control unit, comprising:
   identifying a grid dip and a return of grid voltage;
   determining a set point value for a torque of the generator after identification of the grid dip, wherein the set point value is closer to the saturation limit of the torque control unit than the set point value being used before the grid dip; and
   initializing a component in the torque control unit at the set point value,
   wherein the wind energy installation control device of claim 1 is used to perform the method.

* * * * *